United States Patent Office 3,437,519
Patented Apr. 8, 1969

3,437,519
PROCESS FOR PREVENTING SHRINKAGE
AND FELTING OF WOOL
Arno Rudolph Friedl, Hordle, near Lymington, and Roger
Gavin Dingley, Southampton, England, assignors to The
International Synthetic Rubber Company Limited,
Southampton, England, a corporation of the United
Kingdom
No Drawing. Filed Nov. 15, 1965, Ser. No. 507,661
Claims priority, application Great Britain, Nov. 17, 1964,
46,764/64
Int. Cl. D06m 3/02
U.S. Cl. 117—141                                          9 Claims

ABSTRACT OF THE DISCLOSURE

A process for treating wool which provides protection against shrinkage and felting, comprising impregnating on wool an organic solvent solution of an acid chloride modified synthetic rubber selected from the group consisting of butadiene homopolymer, isoprene homopolymer, and copolymers of butadiene, isoprene and minor proportions of monomers selected from the group consisting of styrene, vinyl toluene, and divinyl benzene.

---

The invention relates to a process for the treatment of wool to protect it against shrinkage and felting.

The methods available for reducing the shrinking and felting of wool include those using acid chlorides which generally involve the heating of wool impregnated with organic acid chlorides. Some methods involve the use of catalysts such as methyl pyrolidone or butyrolactone. Two stage processes are sometimes involved.

In accordance with the present invention wool is treated with an acid chloride synthetic rubber by a simple one stage impregnation technique. Fabrics may be impregnated and allowed to dry at room temperature or heated. The heating of fabrics improves the resistance of the fabrics to loss of rubber by continuous extraction with organic solvents.

Rubbers on which between 1 and 20 percent of the available double bonds have been replaced by a molecule containing an acid chloride group, COCl are particularly suitable for use in the present invention.

The invention relates more specifically to the use of carboxylated rubbers, i.e., rubbers which have been modified by the incorporation of carboxyl groups, COOH, and which have subsequently been converted to the acid chloride, —COCl. Rubber polymers which have been modified for this invention include both homopolymers of butadiene and isoprene, and copolymers of butadiene and isoprene with other monomers, suitable copolymers being styrene, vinyl toluene and divinyl benzene wherein the proportion of butadiene in the copolymer is greater than 50% by weight. The rubber may be initially modified to incorporate carboxyl groups (—COOH) by reaction with any compound which contains one or more free thiol (SH) or carboxylic acid ($CO_2H$) groups and preferably by reaction with mercaptopropionic acid ($SHCH_2CH_2CO_2H$), mercaptosuccinic acid

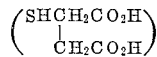

or thioglycollic acid, $SHCH_2CO_2H$. Subsequent modification of the carboxylic acid group on the polymer to the acid chloride is carried out with thionyl chloride, $SOCl_2$, phosphorus trichloride, $PCl_3$, phosphorus pentachloride, $PCl_5$, or phosphorus oxychloride, $POCl_3$.

It has been found that the molecular weight or viscosity of the rubber polymer is not critical; for example they may be high molecular weight polymers with molecular weight in the range 150,000–600,000 or of lower molecular weights in the range 2,000–10,000.

Wool fabrics may be treated with a solution of the modified rubber at room temperature and suitable organic solvent for the rubber may be used, e.g., toluene, benzene, carbon tetrachloride, chloroform, etc.

The degree of modification to the wool fabrics by the invention is dependent to some extent on the amount of rubber bound to the fabrics. A novel feature of the invention is, however, the excellent shrink proofing properties conferred by very low levels of the modified rubbers, i.e., levels of between 1 and 5 percent by weight based on the wool. Deposits greater than 5 percent may be used although some loss in the characteristics handle of wool results, and the proportion of rubber permanently bound to the wool is lower.

Impregnation of fabrics may be carried out by immersing woollen cloth into the rubber solution and removing excess solvent by passing through squeeze rollers, centrifuging or any similar treatment to remove excess solution. It is to be understood that there is no lower limit on the strength of solution of rubber in solvent to give the preferred rubber deposit of 1.5%. The strength of solution depends on the method used for removing excess solvent, and type and nature of the fabric under treatment. Unreacted thionyl chloride or phosphorus trichloride can be present in the impregnation solution. The fabrics may be allowed to dry at room temperature or may be dried at elevated temperature but clearly not at such a temperature or for such a duration that the fabric or rubber will be damaged. We have found convenient temperatures and times to be 80°–90° C. for 15 minutes, 100° C. for 10 minutes and 120° C. for 5 minutes. Additionally, of course, the type and nature of the fabric will affect the choice of drying time and temperature.

The wool is normally treated when in the form of a woven or knitted or other fabric, but the treatment may also, if desired, be applied to wool in yarn form or other nonfabricated form. The nonfabricated forms which may be treated include (besides yarns), rovings, slivers, unprepared fibres, felts and the like. The wool may be in dyed or undyed form; it may be in pure form (i.e., 100% wool) or in the form of a blend with other textile fibres, which may be natural and/or artificial; and it may be in chemically unmodified form or in reduced form. The reduced form of wool is that in which disulphide bonds in the wool molecules have been broken to give thiol groups, which it is believed, increase the number of sites on the wool molecules at which chemical modification may be effected; some examples of the reducing agents which may be used to produce this reduced form of wool are sulphites, bisulphites and thioglycollic acid.

The treatment of wool with a modified rubber as described above may result in chemical modification by reaction between the acid chloride and the protein wool molecule. The nature of the bond may be through reaction with amino, hydroxyl or thiol groups. A further possibility is the reduction of wool with thionyl chloride or the formation of an acid chloride from the carboxyl groups in the wool molecule. Subsequent reaction of the modified wool with the rubber may occur.

The modified wool exhibits many advantages over normal wool and these are illustrated below:

(1) The modified wool has outstanding dimensional stability when washed with conventional soap or detergent solutions.

(2) Wool fabrics treated as described are resistant to felting when washed with conventional soap or detergent solutions.

(3) During manufacture wool fabrics may come in contact with acid substances, e.g., during dyeing and carbonising. The modified wool in this invention has excellent resistance to attack by acids.

(4) The modified wool fabrics have very good crease resisting properties.

The invention will now be described by the following specific examples in which shrinkage was measured by a standard shrinkage test. In this test fabrics were washed for 1 hour in an English Electric Liberator washing machine model 4021 at pH 7 in a phosphate buffer solution. The temperature of washing was 40° C. and a fabric weight to liquor ratio of 20 to 1 was used. A load of 1000 gm. of fabrics was used for each wash. The use of a buffer solution instead of conventional soap solutions reduced the possibility of slight variations in shrinkage figures due to pH changes. The shrinkage figures quoted are the total shrinkage i.e. relaxation shrinkage plus shrinkage due to felting.

EXAMPLE I

Carboxylated polybutadiene was prepared by the reaction between polybutadiene and thioglycollic acid to give 5 percent modification, i.e., the addition of thioglycollic acid to replace 5 percent of the double bonds available in the rubber.

The modified rubber (800 gm. of a 2.0 percent solution in toluene) was heated with thionyl chloride (1.5 gm.) for 45 minutes at 50° C. Infrared analysis indicated the formation of the acid chloride modified rubber.

A sample of the wool fabric was immersed for 60 seconds in the 2 percent rubber solution which had been allowed to cool to room temperature.

The cloth was run through squeeze rollers to remove excess liquid and allowed to dry in air. The fabric was found to have a polymer uptake of 5.0 percent. The relative performance of the fabric in terms of shrinkage, tensile strength and resistance to acid attack is shown below:

| | Percent modified rubber | Percent shrinkage on washing | Tensile strength, ½" warp strip strength (kgs.) | Resistance to 5N HCl at boil. Time of dissolution of fabric. |
|---|---|---|---|---|
| Control fabric | | 60 | 2.35 | 15 min. |
| Treated fabric | 5.0 | 2 | 2.50 | >5 hours. |

The treated fabric was extracted for 24 hours with perchloroethylene at 40° C. and 60 percent of the modified rubber remained attached to the wool fabric.

EXAMPLE II

Wool fabric was immersed in a 1 percent solution of the above described acid-chloride modified rubber, containing free thionyl chloride. A 2.5 percent polymer uptake on the weight of fabric was measured. The fabric was heated for 4 hours at 80° C. and unreacted polymer extracted with perchloroethylene for 24 hours at 40° C. 95 percent of the rubber remained attached to the wool.

A shrinkage of less than 2 percent was measured.

EXAMPLE III

Wool fabric was immersed in a 0.5 percent solution of the acid chloride modified rubber as described in Example I. (A pickup of 1.5 percent rubber was measured on the weight of fabric. The sample was allowed to dry in air.) A shrinkage of less than 2 percent was measured.

EXAMPLE IV

Carboxylated polybutadiene (800 gm. of a 2 percent solution in toluene) was heated with phosphorus trichloride (4.0 g.) for 30 minutes at 50° C.

A sample of wool fabric was immersed in the solution for 60 seconds. The cloth was run through squeeze rollers to remove excess liquid and allowed to dry at room temperature.

A pickup of 4.5 percent rubber on the weight of fabric was measured. Shrinkage was less than 2 percent.

EXAMPLE V

Polyisoprene was reacted with thioglycollic acid to replace 5% of the double bonds available.

The modified rubber (10 kg. of a 2% solution in perchloroethylene) was reacted with phosphorus oxychloride (8 g.) for 30 min. at 45° C.

Wool yarns were passed through the solution and excess liquor removed by squeeze rollers. The yarns were dried at 90° C. for 30 min. A 3% solids pickup on yarns was measured.

Knitted and woven fabrics prepared from the treated yarns were completely resistant to shrinkage and felting. A shrinkage of less than 3% was measured after washing.

EXAMPLE VI

Styrene-butadiene (25/75) rubber was carboxylated by reaction with thioglycollic acid to replace 10% of the available double bonds.

The carboxylated rubber (3.32 kg. of 2% solution in xylene) was reacted with phosphorus trichloride (18 g.) at 50° C. for 30 min.

Wool fabric was immersed in the above solution for 2 min., allowed to dry at room temperature and heated at 120° C. for 2 min. A 3.5% pickup on the weight of fabric was measured.

The fabric gave a 2% shrinkage after washing. An untreated control fabric gave 65% shrinkage.

What is claimed is:

1. A process for treating wool which provides protection against shrinkage and felting, comprising impregnating on the wool an organic solvent solution of an acid chloride modified synthetic rubber selected from the group consisting of butadiene homopolymer, isoprene homopolymer, and copolymer of butadiene, isoprene, and minor proportions of monomers selected from the group consisting of styrene, vinyl toluene, and divinyl benzene, wherein said acid chloride modified synthetic rubber is prepared by first modifying the rubber to incorporate carboxyl groups (—COOH) which are subsequently converted to the acid chloride (—COCl).

2. A process according to claim 1 wherein between 1 and 20 percent of the available double bonds of the rubber have been replaced by a molecule containing an acid chloride group (—COCl).

3. A process according to claim 1 wherein the carboxyl groups are incorporated by reaction of the rubber with a compound containing at least one free thiol (SH) group and at least one carboxylic acid group.

4. A process according to claim 3 wherein the compound is selected from a group consisting of mercaptoproprionic acid, or mercaptosuccinic acid and thioglycollic acid.

5. A process according to claim 3 wherein between 1 and 20 percent of the available double bonds of the rubber have been replaced by a molecule containing an acid chloride group (—COCl).

6. A process according to claim 1, wherein the conversion of the carboxyl groups to the acid chloride is carried out with a member of the group consisting of thionyl chloride ($SOCl_2$), phosphorus trichloride ($PCl_3$), phosphorus pentachloride ($PCl_5$) and phosphorus oxychloride ($POCl_3$).

7. The process of claim 1 wherein the wool is impregnated with the rubber in proportion between 1-5% of rubber based on the dry weight of wool.

8. The impregnated wool made by the process of claim 1.

9. The impregnated wool made by the process of claim 7.

References Cited

UNITED STATES PATENTS

| 2,447,772 | 8/1948 | Rust et al. | 117—141 X |
| 2,704,729 | 3/1955 | Fetscher | 117—141 X |
| 2,993,748 | 7/1961 | Koenig | 117—141 X |
| 3,301,700 | 1/1967 | Maloney | 117—142 X |
| 3,310,428 | 3/1967 | Maloney | 117—142 X |

WILLIAM D. MARTIN, *Primary Examiner.*

H. J. GWINNELL, *Assistant Examiner.*

U.S. Cl. X.R.

8—128